United States Patent
Moriya

(10) Patent No.: US 10,028,126 B2
(45) Date of Patent: Jul. 17, 2018

(54) COMMUNICATION APPARATUS, COMMUNICATION METHOD, AND NON-TRANSITORY COMPUTER-READABLE STORAGE MEDIUM

(71) Applicant: CANON KABUSHIKI KAISHA, Tokyo (JP)

(72) Inventor: Takashi Moriya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/585,263

(22) Filed: May 3, 2017

(65) Prior Publication Data
US 2017/0339742 A1 Nov. 23, 2017

(30) Foreign Application Priority Data
May 23, 2016 (JP) .................................. 2016-102763

(51) Int. Cl.
| H04B 5/00 | (2006.01) |
| H04M 1/00 | (2006.01) |
| H04W 8/00 | (2009.01) |
| H04W 76/19 | (2018.01) |
| H04W 76/14 | (2018.01) |

(52) U.S. Cl.
CPC ........... *H04W 8/005* (2013.01); *H04W 76/14* (2018.02); *H04W 76/19* (2018.02)

(58) Field of Classification Search
CPC .......... H04B 7/00; H04M 1/00; H04W 4/008; H04W 36/08; H04W 40/24; H04W 40/248; H04W 84/12; H04W 84/20; H04W 88/08; H04L 9/351; H04L 61/6068
USPC ................ 455/41.1, 41.2, 41.3, 552.1, 553.2
See application file for complete search history.

(56) References Cited

U.S. PATENT DOCUMENTS

| 8,254,346 | B2 * | 8/2012 | Karaoguz | ............. | G01S 5/0252 370/245 |
| 9,100,774 | B2 * | 8/2015 | Suzuki | .................. | H04W 4/008 |
| 9,433,031 | B2 * | 8/2016 | Hiramatsu | ............... | H04B 5/02 |

FOREIGN PATENT DOCUMENTS

JP 2014-131145 A 7/2014

* cited by examiner

*Primary Examiner* — Quochien B Vuong
(74) *Attorney, Agent, or Firm* — Carter, Deluca, Farrell & Schmidt, LLP

(57) ABSTRACT

A communication apparatus capable of communication by a predetermined wireless connection method, decides which of the communication apparatus and a communication partner apparatus operates as an access point and which operates as a client, connects to the communication partner apparatus by the predetermined wireless connection method, based on the decision, determines whether a connection to the communication partner apparatus is disconnected, performs reactivation processing for causing the communication apparatus to enter a state in which communication by the predetermined wireless connection method is possible. The communication apparatus, if it is decided that the communication apparatus operates as the client and it is determined that the connection is disconnected, performs the reactivation processing.

9 Claims, 14 Drawing Sheets

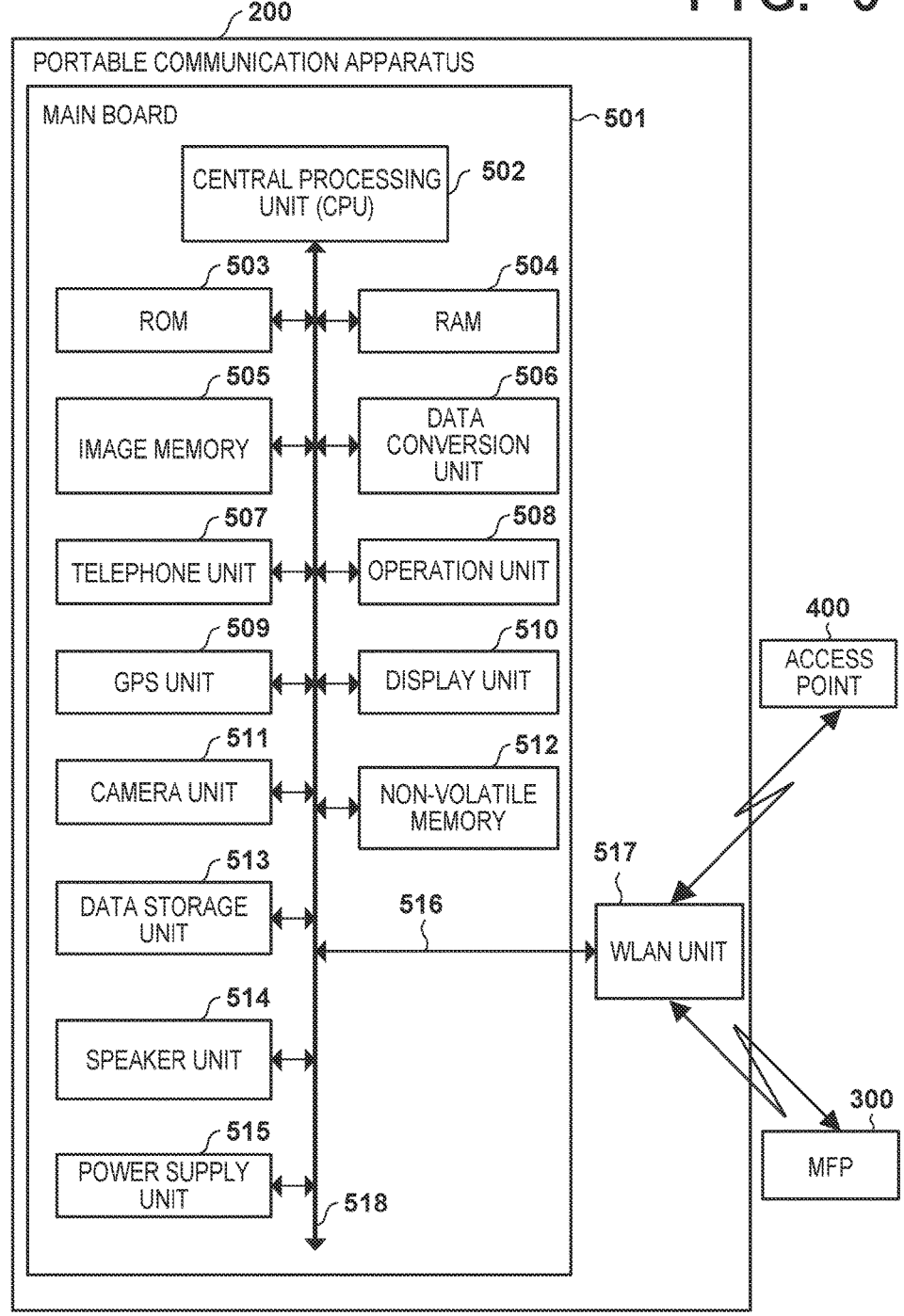

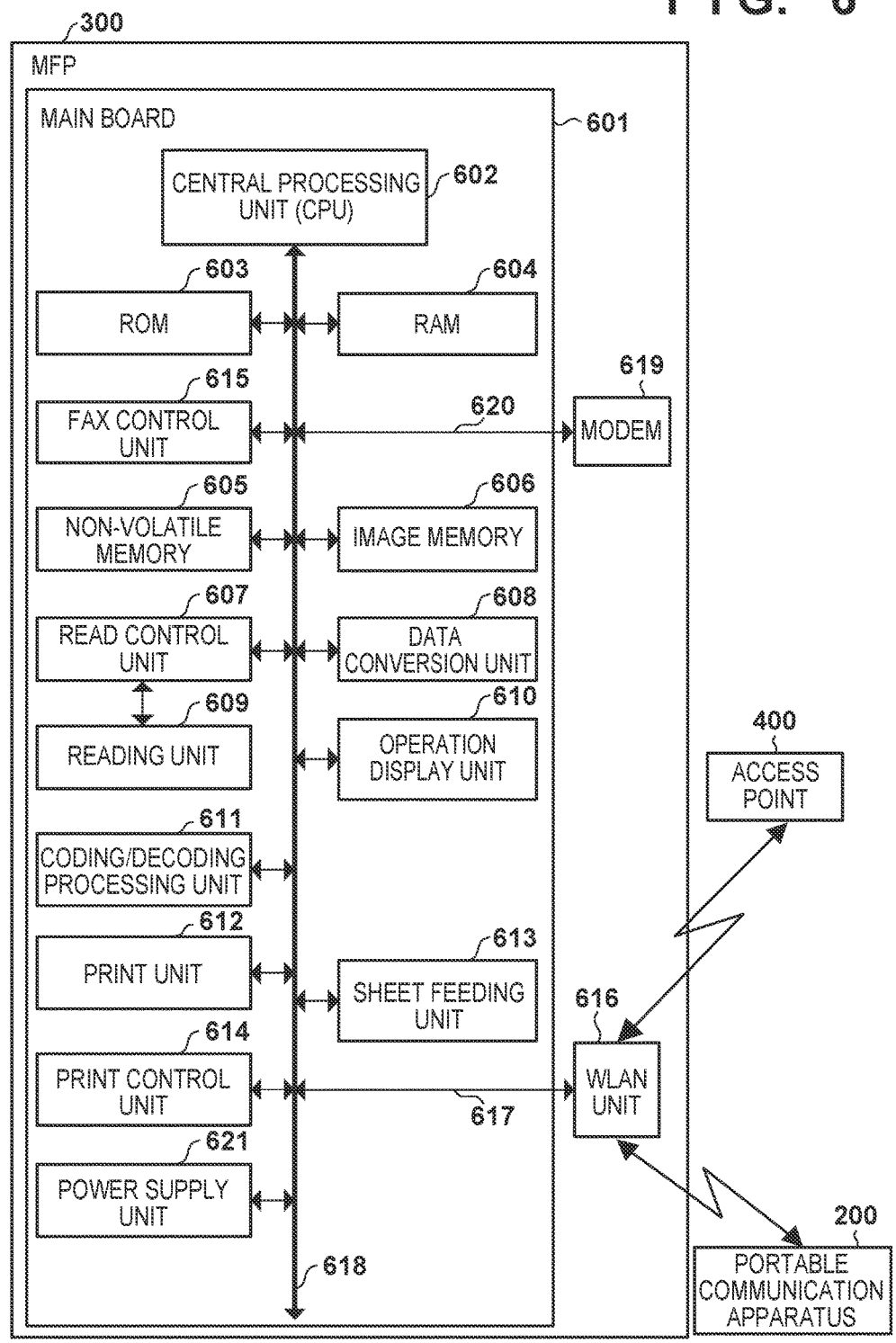

F I G. 12
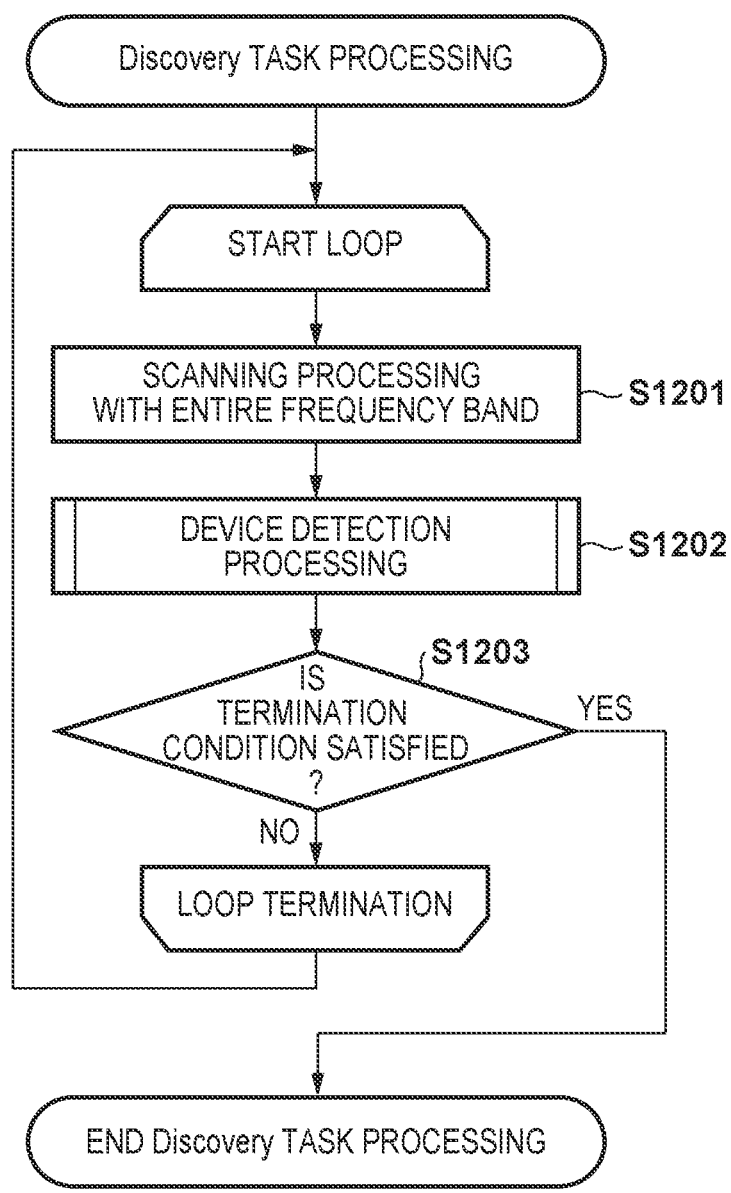

COMMUNICATION APPARATUS, COMMUNICATION METHOD, AND NON-TRANSITORY COMPUTER-READABLE STORAGE MEDIUM

BACKGROUND OF THE INVENTION

Field of the Invention

The present invention relates to a communication apparatus, a communication method, and a non-transitory computer-readable storage medium.

Description of the Related Art

As a wireless connection method between a communication apparatus and a communication partner apparatus in a wireless communication system, other than wireless connection methods that are via an access point (for example an infrastructure mode), a peer-to-peer (P2P) wireless connection method is known. In the P2P wireless connection method, the communication apparatus directly performs a wireless connection with the communication partner apparatus by the communication apparatus or a communication partner operating as an access point.

As a specification for realizing such a P2P wireless connection method, for example Wi-Fi Direct (registered trademark) is known. A communication apparatus that supports Wi-Fi Direct can operate as an access point (a group owner), and a wireless connection with a communication partner apparatus that operates as a client can be made directly. At that time, which of the communication apparatus and the communication partner apparatus operates as the access point is decided by Group Owner Negotiation. By this, a conventional device that is a dedicated access point becomes unnecessary, and a direct connection between apparatuses is realized.

Japanese Patent Laid-Open No. 2014-131145 discloses a method in which, when a communication apparatus that supports Wi-Fi Direct tries to connect to another communication apparatus, a user of the communication apparatus selects a desired connection destination (an existing network or a new network).

However, after the communication apparatus operates as a client to connect to the communication partner apparatus that operates as the access point, if the connection is disconnected then the communication apparatus cannot be detected from the other apparatus, and also cannot reconnect. In other words, the communication apparatus enters a state in which it is without exception close to having stopped as a Wi-Fi Direct device, and this leads to a decrease of usability as a result.

SUMMARY OF THE INVENTION

The present invention is something conceived in view of the aforementioned problem, and relates to improving usability of a communication apparatus that operates as a client.

According to one aspect of the present invention, there is provided a communication apparatus capable of communication by a predetermined wireless connection method, which comprises: a decision unit configured to decide which of the communication apparatus and a communication partner apparatus operates as an access point and which operates as a client; a connection unit configured to connect to the communication partner apparatus by the predetermined wireless connection method, based on a decision by the decision unit; a determination unit configure to determine whether a connection by the connection unit is disconnected; and a reactivation unit configured to perform reactivation processing for causing the communication apparatus to stop using an IP address used in communication with the communication partner apparatus that is connected to by the connection unit, and enter a state in which communication by the predetermined wireless connection method is possible, wherein, if it is decided by the decision unit that the communication apparatus operates as the client and it is determined by the determination unit that the connection is disconnected, the reactivation unit performs the reactivation processing.

Further features of the present invention will become apparent from the following description of exemplary embodiments (with reference to the attached drawings).

BRIEF DESCRIPTION OF THE DRAWINGS

FIG. 5 is a block diagram illustrating a configuration of a portable communication apparatus.

FIG. 6 is a block diagram illustrating a configuration of an MFP.

FIG. 11 illustrates a flow of wireless activation processing at a time of soft-on.

FIG. 12 illustrates a flow of WFD mode Discovery task processing.

DESCRIPTION OF THE EMBODIMENTS

Explanation is given below in detail, with reference to the drawings, of embodiments of the present invention as an example. However, display screens, relative arrangements of configuration elements, and the like that are recited in the present embodiment are not particularly intended to limit the scope of the invention thereto, unless specifically stated.

<System Configuration>

Firstly, FIG. 1 through FIG. 6 are used to give an explanation regarding a system configuration for realizing each embodiment explained below.

Figure 1:
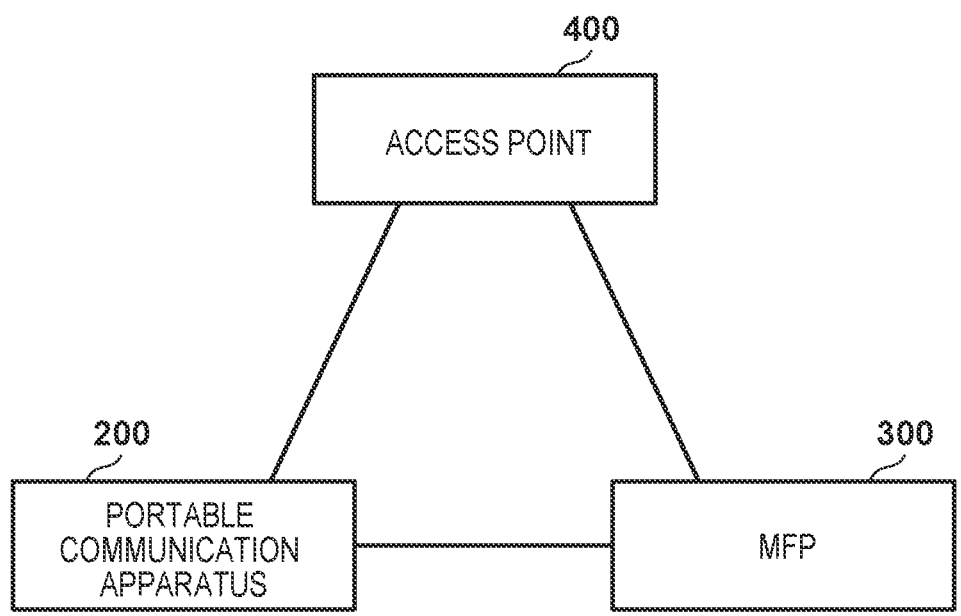
FIG. 1 illustrates an example of a configuration of a wireless communication system.

FIG. 1 illustrates an example of a configuration of a wireless communication system in present embodiments. A wireless communication system in present embodiments is configured from a portable communication apparatus 200, an MFP (Multi-Function Printer), and an access point 400.

The portable communication apparatus 200 is an apparatus that can perform wireless LAN (WLAN) communication. The portable communication apparatus 200 may be a personal information terminal such as a PDA (Personal Digital Assistant), a portable phone, a digital camera, or the like. The MFP 300 performs wireless communication with the portable communication apparatus 200. In present embodiments, it is assumed that the MFP 300 has a print function and a reading function (a scanner), but it may also have a FAX function or a telephone function. The access point 400 is an apparatus that can perform WLAN communication. The access point 400 provides infrastructure mode communication by relaying communication between apparatuses to which a connection has been permitted. The portable communication apparatus 200 and the MFP 300 may perform infrastructure mode wireless communication via the access point 400, or may perform P2P communication that conforms to a predetermined wireless connection method such as Wi-Fi Direct. Note that the portable communication apparatus 200 and the MFP 300 can execute processing corresponding to a plurality of print services via WLAN as described later. In addition, these apparatuses are examples of communication apparatuses, and the communication apparatus of the present invention may be an apparatus other than these apparatuses, for example a PC, a digital camera, digital home electric appliances, or the like.

Figure 2:
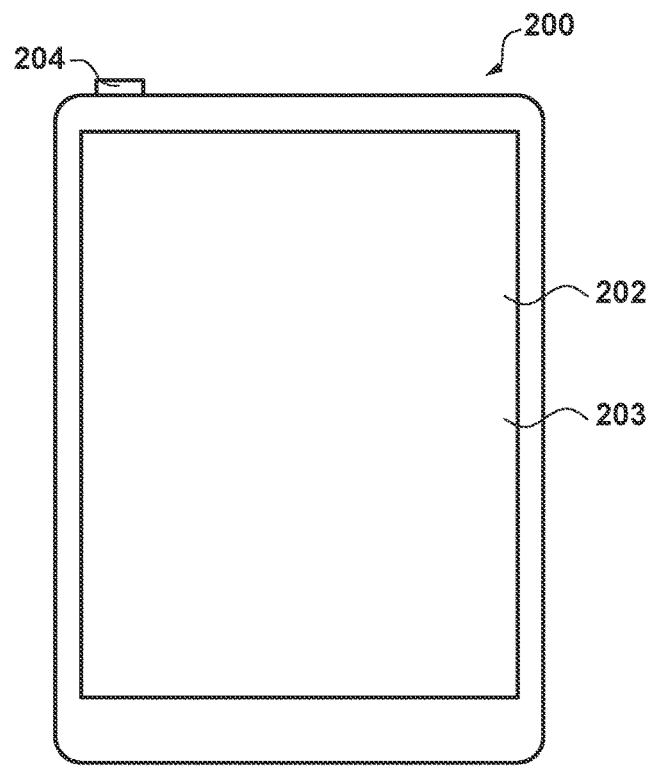
FIG. 2 illustrates an example of an outer appearance of a portable communication apparatus 200.

FIG. 2 illustrates an example of an outer appearance of the portable communication apparatus 200. In the present embodiment, a smart phone is envisioned as the portable communication apparatus 200. Note that a smart phone is a multiple function type portable phone in which is installed a camera, a Web browser, an electronic mail function or the like, in addition to a function of a portable phone.

A display unit 202 is a display equipped with a display mechanism such as an LCD (liquid crystal display), for example. An operation unit 203 is equipped with a touch panel type operation mechanism and detects an operation by a user. Note that a range of the operation unit 203 is assumed to be included in a range of the display unit 202. There is a representative operation method where the display unit 202 displays a button icon or a software keyboard, and an operation event is detected by a user making contact with a location thereof. A power supply key 204 is a hard key used when a power supply is turned on and off.

Figure 3:
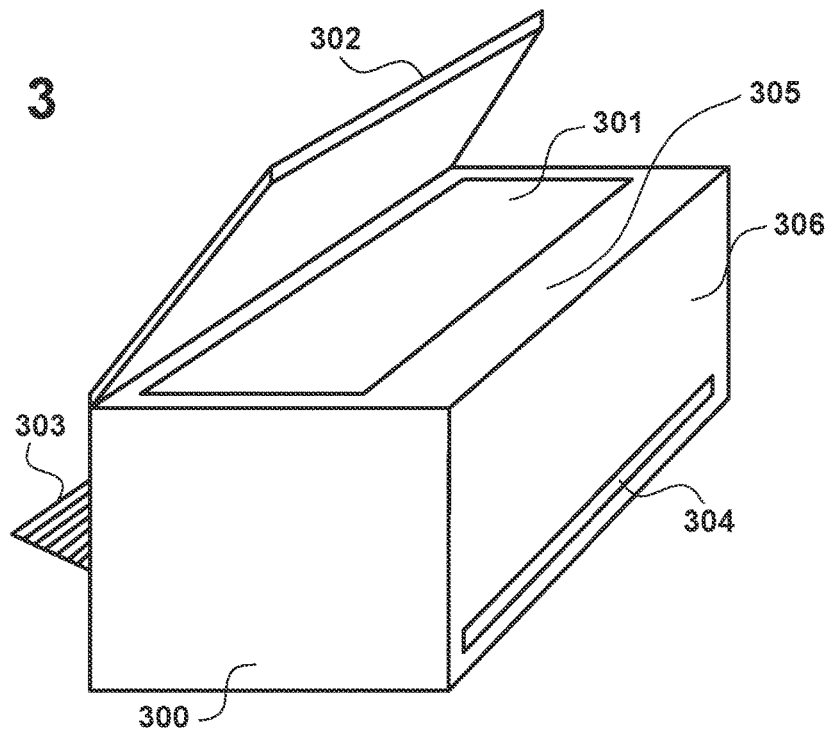
FIG. 3 illustrates an example of an outer appearance of an MFP 300.

FIG. 3 illustrates an example of an outer appearance of the MFP 300. In FIG. 3, a document platen 301 is a glass type transparent base for placing a document to be read by a scanner (a reading unit 609 in FIG. 6). A document cover 302 is a cover for pressing a document when reading by a scanner is performed, and for configuring so that a light from a light source irradiating the document when reading does not leak outside. A printing sheet insertion port 303 is an insertion port in which various sizes of sheets can be set. Sheets set in the printing sheet insertion port 303 are conveyed to a print unit one sheet at a time, and are discharged from a printing sheet discharging port 304 after being printed by a print unit (a print unit 612 in FIG. 6). An operation display unit 305 is configured from keys such as a character input key, a cursor keypad, a deciding key, a cancel key or the like, and an LED (light-emitting diode) or an LCD (liquid crystal display). The operation display unit 305 can perform activation of various functions and various kinds of setting as the MFP, based on an operation by a user. Also, the operation display unit 305 may be configured by a touch panel. A WLAN antenna 306 is an antenna for communicating by WLAN and is embedded in the MFP 300.

Figure 4A:
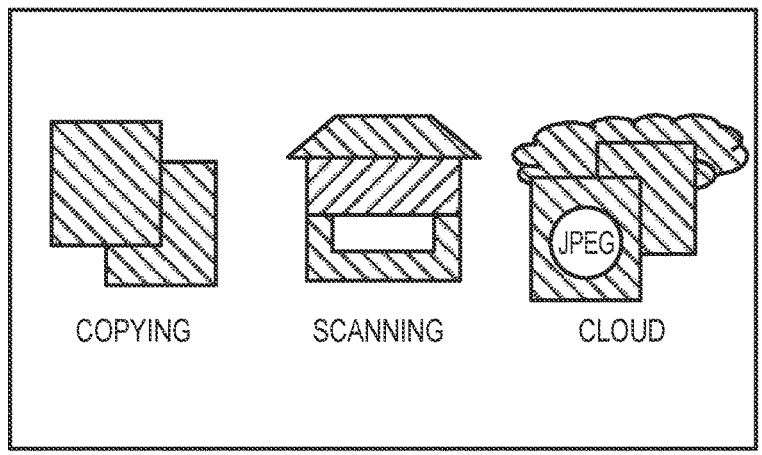
FIGS. 4A-4C illustrate examples of a screen display of the MFP 300.
Figure 4B:
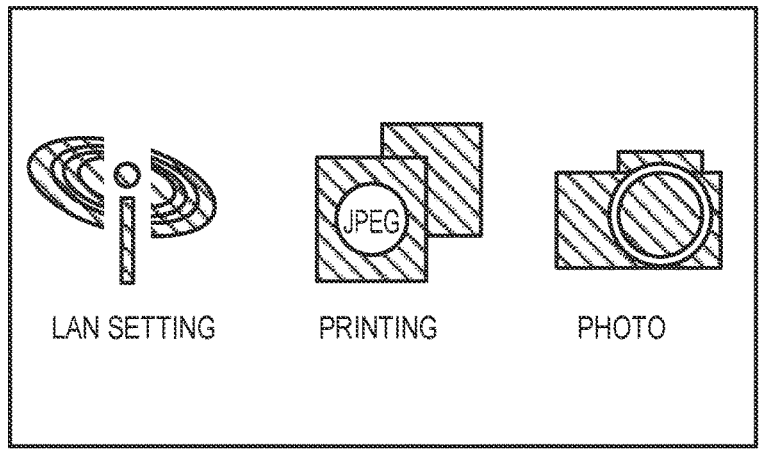
Figure 4C:
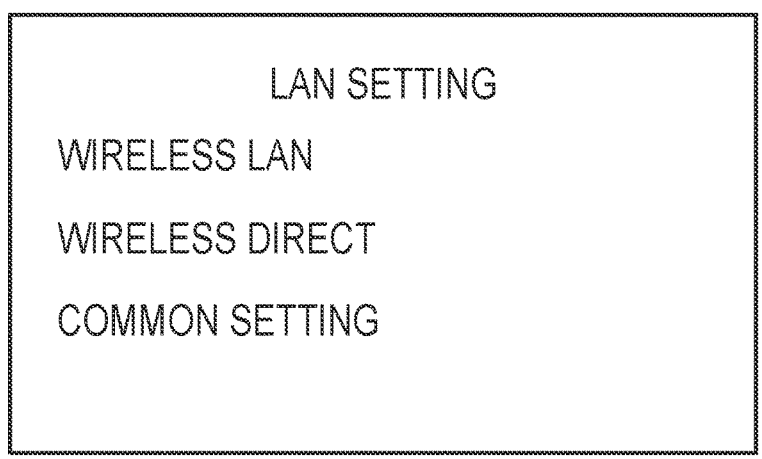

FIGS. 4A-4C schematically illustrate examples of screen displays in the operation display unit 305 of the MFP 300. FIG. 4A illustrates a home screen that indicates a state in which the MFP 300 is powered on and is not performing an operation such as printing or scanning (an idle state). In the home screen in FIG. 4A, in accordance with a key operation or a touch panel operation by a user, the MFP 300 is capable of a menu display, various settings, or function execution for copying, scanning, and a cloud function that uses Internet communication. From the home screen in FIG. 4A, in accordance with a key operation or a touch panel operation by a user, the operation display unit 305 can seamlessly display different functions from FIG. 4A. FIG. 4B is an example of these and illustrates a screen by which execution of printing or photo functions, or a change of a LAN setting is possible. FIG. 4C illustrates a screen displayed when a user selects LAN setting, in the screen of FIG. 4B. From the screen of FIG. 4C, a user can execute each kind of LAN setting change such as enabling/disabling a setting for an infrastructure mode (wireless LAN) and enabling/disabling a setting for a WFD mode (wireless direct).

FIG. 5 is a block diagram illustrating a configuration of the portable communication apparatus 200. The portable communication apparatus 200 has a main board 501 that performs main control and a WLAN unit 517 that performs WLAN communication. Each kind of configuration element (ROM 503 through a power supply unit 515) in the main board 501 is connected to each other via a system bus 518 managed by a CPU 502. Also, the WLAN unit 517 is connected to the main board 501 via a bus cable 516.

In the main board 501, the CPU (central processing unit) 502 is a system control unit and controls the portable communication apparatus 200 as a whole. Processing in the portable communication apparatus 200 illustrated below is executed by control by the CPU 502. The ROM (Read Only Memory) 503 stores a control program, an embedded operating system (OS) program or the like that are executed by the CPU 502. In the present embodiment, each control program stored in the ROM 503 performs software control such as scheduling or task switching, under management of an embedded OS stored in the ROM 503.

A RAM (Random Access Memory) 504 is configured by an SRAM (Static RAM) or the like and stores data such as a program control variable. In addition, the RAM 504 stores data such as a setting value registered by a user or management data of the portable communication apparatus 200, and provides various work buffer regions. An image memory 505 is configured by a memory such as a DRAM (Dynamic RAM), and temporarily stores image data received via the WLAN unit 517 or image data read from a data storage unit 513 for processing by the CPU 502. A non-volatile memory 512 is configured by a memory such as a flash memory and continues to store data even if the power supply is off. Note that memory configurations of the RAM 504, the image memory 505 and the non-volatile memory 512 are not limited to this. For example, the image memory 505 and the RAM 504 may be shared, and the data storage unit 513 can perform backup of data or the like. Also, in the present embodiment, a DRAM is used for the image memory 505, but there is no limitation to this because there are cases in which other storage mediums such as a hard disk or a non-volatile memory is used.

A data conversion unit 506 performs analysis of data of various formats, or data transformations such as color conversions and image conversions. A telephone unit 507 realizes communication by telephone by performing control of a telephone line and processing of audio data that is input and output via a speaker unit 514. An operation unit 508 controls a signal detected in the operation unit 203 (FIG. 2). A GPS (Global Positioning System) unit 509 obtains position information such as a current latitude and longitude of the portable communication apparatus 200. A display unit 510 corresponds to the display unit 202 in FIG. 2. The display unit 510 is capable of various input operations, display of a status condition or operation state of the MFP 300, or the like.

A camera unit 511 has a function for electrically recording and encoding (image capturing) an image that is input via a lens (not shown). An image captured by the camera unit 511 is saved in the data storage unit 513. The speaker unit 514 realizes a function for inputting or outputting audio for a telephone function, and also a function such as for an alarm notification. The power supply unit 515 is a portable battery and performs a power supply control into the portable communication apparatus 200. Note that the portable communication apparatus 200 may be in one of the following power states. That is, it is in one of a battery exhausted state in which there is no remaining capacity in the battery (the power supply unit 515), a powered off state (soft-off) in which the power supply key 204 is not pressed, an activated state (soft-on) that is normally activated, and a power saving state in which the apparatus is activated but is saving power.

The WLAN unit 517 performs data communication in a WLAN system that conforms to an IEEE 802.11 series. The WLAN unit 517 can perform communication based on Wi-Fi Direct (WFD) that conforms to a Wi-Fi Direct specification, and communication by the software AP mode or the infrastructure mode. The WLAN unit 517 converts data to a packet and performs a packet transmission to another device. On the other hand, the WLAN unit 517 restores a packet from an external device to original data, and transmits it to the CPU 502.

FIG. 6 is a block diagram illustrating a configuration of the MFP 300. The MFP 300 has a main board 601 for performing main control, a WLAN unit 616 for performing WLAN communication, and a modem 619 for processing a FAX. Each kind of configuration element (a ROM 603 through a FAX control unit 615 and a power supply unit 621) in the main board 601 is connected to each other via a system bus 618 managed by a CPU 602. In addition, the modem 619 and the WLAN unit 616 are connected to the main board 601 via a bus cable 620 and a bus cable 617 respectively.

In the main board 601, the CPU (central processing unit) 602 is a system control unit and controls the MFP 300 overall. Processing in the MFP 300 illustrated below is executed by control by the CPU 602. The ROM 603 stores a control program, an embedded operating system (OS) program or the like that the CPU 602 executes. In the present embodiment, each control program stored in the ROM 603 performs software control such as scheduling or task switching under management of an embedded OS stored in the ROM 603. A RAM 604 is configured by an SRAM or the like, stores data such as a program control variable, stores data such as a setting value registered by a user or management data of the MFP 300, and various work buffer regions are provided.

A non-volatile memory 605 is configured by a memory such as a flash memory and continues to store data even if the power supply is turned off. An image memory 606 is configured by a memory such as a DRAM, and stores image data received via the WLAN unit 616, image data processed by a coding/decoding processing unit 611, or the like. In addition, similarly to the portable communication apparatus 200, the memory configuration is not limited to this. A data conversion unit 608 performs analysis of data of various formats, transformation from image data to print data, or the like.

A read control unit 607 controls the reading unit 609 (for example, a CIS image sensor (a contact image sensor)) and optically reads an image that is on a document. Next, an image signal, which converts this to electrical image data, is outputted. At this point, various image processing such as binarization processing and halftone processing may be performed before outputting.

An operation display unit 610 corresponds to the operation display unit 305 in FIGS. 4A-4C. In the operation display unit 610, a power button is included and it is possible to switch a power supply on and off. The coding/decoding processing unit 611 performs encoding/decoding processing and resizing processing of image data (JPEG, PNG, or the like) handled by the MFP 300. A sheet feeding unit 613 holds sheets for printing. Feeding of sheets from the sheet feeding unit 613 is performed in accordance with control by a print control unit 614. A plurality of the sheet feeding unit 613 may be prepared to hold plurality of types of sheets in a single apparatus. In this case, control of which feeding unit to feed from can be performed in accordance with control by the print control unit 614.

With respect to image data to be printed, the print control unit 614 outputs it to the print unit 612 after performing various image processing on it such as smoothing processing, printing density correction processing, and color correction. The print unit 612 prints images by discharging from a printhead ink supplied from an ink tank, for example (in other words, an ink-jet printer). Also, the print control unit 614 also fulfills a role of reading information of the print unit 612 periodically and updating information of the RAM 604. For example, the print control unit 614 can update status information such as remaining amounts of ink tanks and a state of the printhead. A description of functions of the WLAN unit 616 is omitted, because they are the same as the WLAN unit 517 in the portable communication apparatus 200. Furthermore, the power supply unit 621 is further included on the main board 601, and it converts power supplied by a battery or an external power source (a commercial power supply (AC power)) to a direct current which is supplied to each processing device. If the power button of the operation display unit 610 is turned on while there is remaining capacity of the battery or the MFP 300 is connected to the external power source, a soft-on state is entered, and the MFP 300 enters a state in which normal operation is possible. If the power supply of the operation display unit 610 is turned off while there is remaining capacity of the battery or the MFP 300 is in a state of being connected to an external power source, a soft-off state is entered, and a state in which display by the operation display unit 610 is turned off and operation that uses the reading unit 609 or the print unit 612 cannot be performed is entered. Even in the soft-off state, a timer or the like in the MFP 300 continues operation, and maintenance processing that is periodically performed is executed. When there is no remaining capacity of the battery and the MFP 300 is not connected to external power source, a hard-off state is entered and operation of the MFP 300 stops.

<Regarding the P2P Method>

Figure 7:
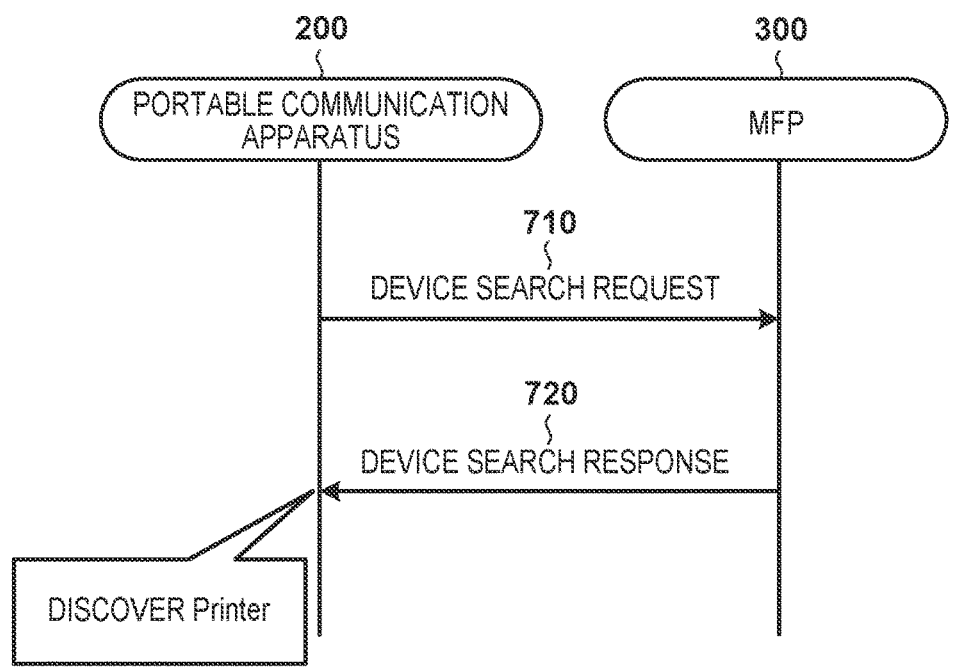
FIG. 7 illustrates a Wi-Fi mode device search sequence.
Figure 8:
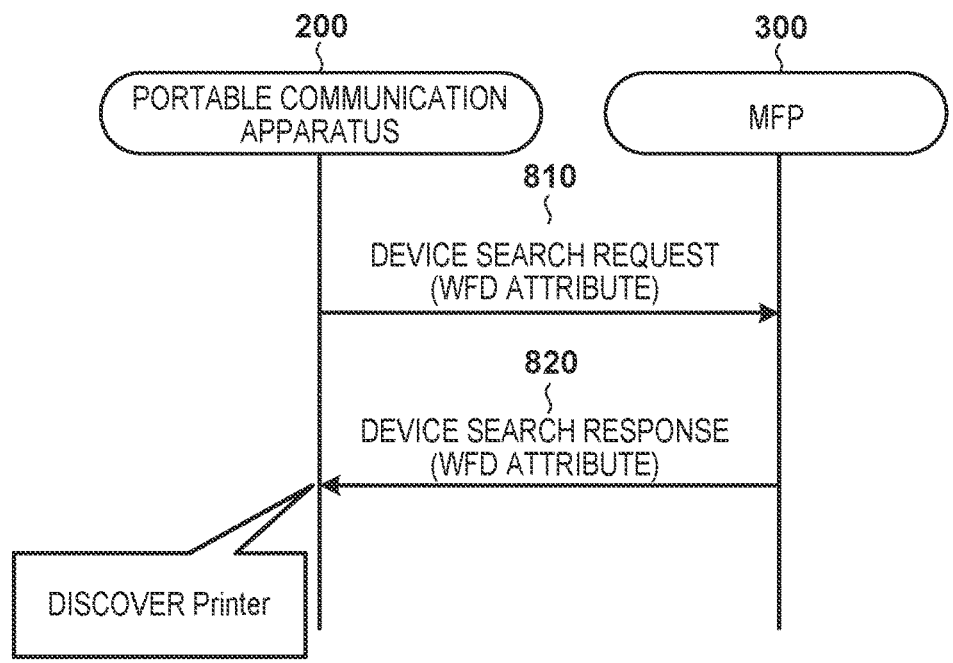
FIG. 8 illustrates a WFD mode device search sequence.

As a wireless connection method for realizing P2P communication in communication in a WLAN, a wireless connection method that conforms to Wi-Fi Direct may be considered (a Wi-Fi Direct mode (a WFD mode)). Here, device search sequences for the Wi-Fi mode and the WFD mode are explained with reference to FIG. 7 and FIG. 8. FIG. 7 illustrates a device search sequence for the Wi-Fi mode, and FIG. 8 illustrates a device search sequence for the WFD mode. Note that the Wi-Fi mode and the WFD mode respectively conform to a Wi-Fi standard and a Wi-Fi Direct standard. In addition, in FIG. 7 and FIG. 8, the portable communication apparatus 200 is a device of a searching side, and the MFP 300 is a device that is to be a communication partner (a communication partner apparatus).

In the Wi-Fi standard, as in FIG. 7 the portable communication apparatus 200 uses the same device search command (for example a Probe Request frame) to search for the communication partner apparatus. Note that it is possible to cause various attributes to be attached to a device search command in the Wi-Fi standard. By the MFP 300 making a response with respect to the device search command (a device search response), the portable communication apparatus 200 can discover the MFP 300.

In contrast, in the Wi-Fi Direct standard, as in FIG. 8 the portable communication apparatus 200 attaches (specifies) various attributes to a device search command and transmits it. Normally it is recommended to attach as many attributes as can be interpreted, as defined by the specification of the mode (in other words the WFD mode) and the specification that is assumed (if WFD then Wi-Fi), in a response to a device search command for which attributes are specified. Consequently, it is possible to perform a device search that is limited to a target device, because if an attribute included in the device search command is a WFD attribute, only a device that supports Wi-Fi Direct will respond. Alternatively, even if a Wi-Fi device that does not support WFD makes a response to a device search command in which a WFD attribute is included, the response will not include a WFD attribute. Consequently, an apparatus of a side that transmitted the device search command can know whether the apparatus that made the response is a device that supports WFD in accordance with the existence or absence of an attribute included in the device search response.

Note that a device that has a communication function in accordance with Wi-Fi Direct, when performing Wi-Fi Direct communication, firstly can call a dedicated application for realizing the communication function based on a user operation. Next, the device operates based on a user operation with respect to a UI (a user interface) that is an operation screen provided by the application. In accordance with an operation with respect to the UI, the device can automatically execute, for performing Wi-Fi Direct communication, operation for a device search, a negotiation, to a wireless connection.

Next explanation is given regarding WFD mode communication. WFD mode communication can be broadly classified into three stages from a first stage to a third stage. The first stage is communication of a preceding stage for deciding group owner/client roles. In the first stage, firstly between two devices that are to perform communication, one of the devices issues a device search command, and searches for a device to connect to by the WFD mode (device search phase). When the other device that is to be the communication partner is found, information related to functions or services that can be supplied between the devices is confirmed between the two devices (device information confirmation phase).

The second stage is communication for deciding group owner/client roles. In the second stage, which device will become the P2P client and which will become the P2P group owner is decided between the two devices (role deciding phase). The role deciding corresponds to Group Owner Negotiation in P2P, for example.

The third stage is communication after group owner/client roles have been decided. In the third stage, once the client and the group owner have been decided, parameters for performing communication by Wi-Fi Direct are exchanged between the two devices (parameter sharing phase). Based on the exchanged parameters, wireless connection processing and IP connection processing is performed between the P2P client and the group owner (IP connection phase). The parameter exchange phase corresponds to using Wi-Fi Protected Setup to automatically perform a parameter exchange for wireless LAN security, for example. For example, the parameters may include an SSID that is identification information of the wireless network, an encryption key, an encryption method, an authentication key, an authentication method, or the like.

Figure 9:
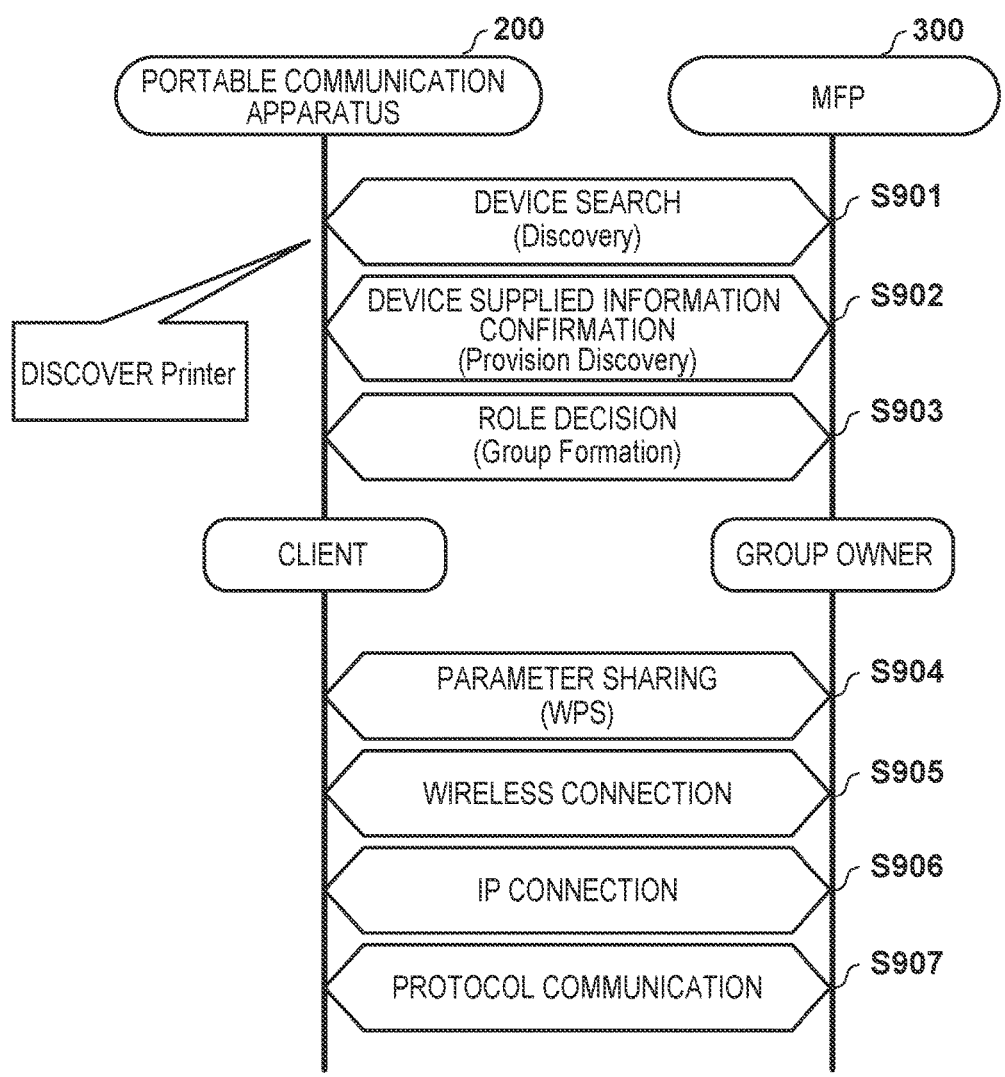
FIG. 9 illustrates a WFD mode wireless connection sequence (the MFP 300: a group owner).

FIG. 9 illustrates a WFD mode wireless connection sequence when the MFP 300 is the group owner. In step S901, the communication partner apparatus is discovered by the device search (the device search phase). This is realized, for example, by one communication apparatus (the portable communication apparatus 200 in FIG. 9) issuing a device search command (Discovery), and the other communication apparatus that is to be the communication partner apparatus (the MFP 300 in FIG. 9) responding to the command. When the MFP 300 is finalized as the communication partner apparatus, the portable communication apparatus 200, in step S902, confirms information relating to functions and services that can be supplied between the devices (the device supplied information confirmation phase). A service or a function is, for example, a print service, an image display service, a file transmission service, a movie streaming service, a moving image display service, or the like. The device information confirmation phase can be performed by Service Discovery in a WFD standard for example. The communication apparatus and the partner apparatus, by confirming this device information therebetween, can know, before a WFD connection, what services an opposing apparatus that can be connected to in the WFD mode can provide. In step S903, the portable communication apparatus 200 and the MFP 300 decide which will become the client and which will become the group owner, as roles (the role deciding phase). This can be performed by Group Owner Negotiation which is processing for deciding the group owner. Note that Group Owner Negotiation is established from exchange of three pieces of information (3-way). The three pieces of information may be, namely, a GO Negotiation Request frame, a GO Negotiation Response frame, and a GO Negotiation Confirmation frame. In GO Negotiation, each of the communication apparatus and the partner apparatus mutually transmit an Intent value that is a value that is respectively set, and the sizes of the Intent values are compared. As a result of the comparison, it is decided that the apparatus with the higher value operates as the GO, and the apparatus with the smaller value operates as the CL. If they were the same value, random values generated thereafter (0 or 1) are compared, and GO and CL are decided.

In step S904, the portable communication apparatus 200 and the MFP 300 exchange parameters for performing communication by Wi-Fi Direct (the parameter sharing phase). This processing is based on a WPS (Wi-Fi Protected Setup) sequence. In the example of FIG. 9, the MFP 300 is the group owner, and the MFP 300 operates as the Register of WPS. In step S905, the portable communication apparatus 200 (the client) and the MFP 300 (the group owner)

perform wireless connection processing (the wireless connection phase). In step S906, the portable communication apparatus 200 (the client) and the MFP 300 (the group owner) perform IP connection processing (the IP connection phase). The MFP 300 which is the group owner operates as a DHCP (Dynamic Host Configuration Protocol) server, and allocates an IP address (an IPv6 address, an IPv4 address) to the portable communication apparatus 200 (the client). In step S907, the portable communication apparatus 200 (the client) and the MFP 300 (the group owner) perform communication that uses a network protocol (service) (the protocol communication phase). As examples of the network protocol, there is Bonjour, IPP, WSD, and the like. Note that a WFD group owner is an apparatus having a role of operating as an access point defined by an IEEE802.11 standard. In addition, the group owner is responsible for a role as a provision apparatus for providing the previously described parameters for wireless communication, a role as an authentication apparatus (authenticator) when performing a 4-way handshake, and a role as a construction apparatus for constructing a wireless LAN. In contrast, a WFD client is an apparatus having a role for operating as a participation apparatus that participates in the wireless LAN constructed by the group owner. The client is responsible for a role as a receiving apparatus for receiving the parameters for wireless communication, and a role as an authentication-target apparatus (supplicant) when the 4-way handshake is performed.

Figure 10:
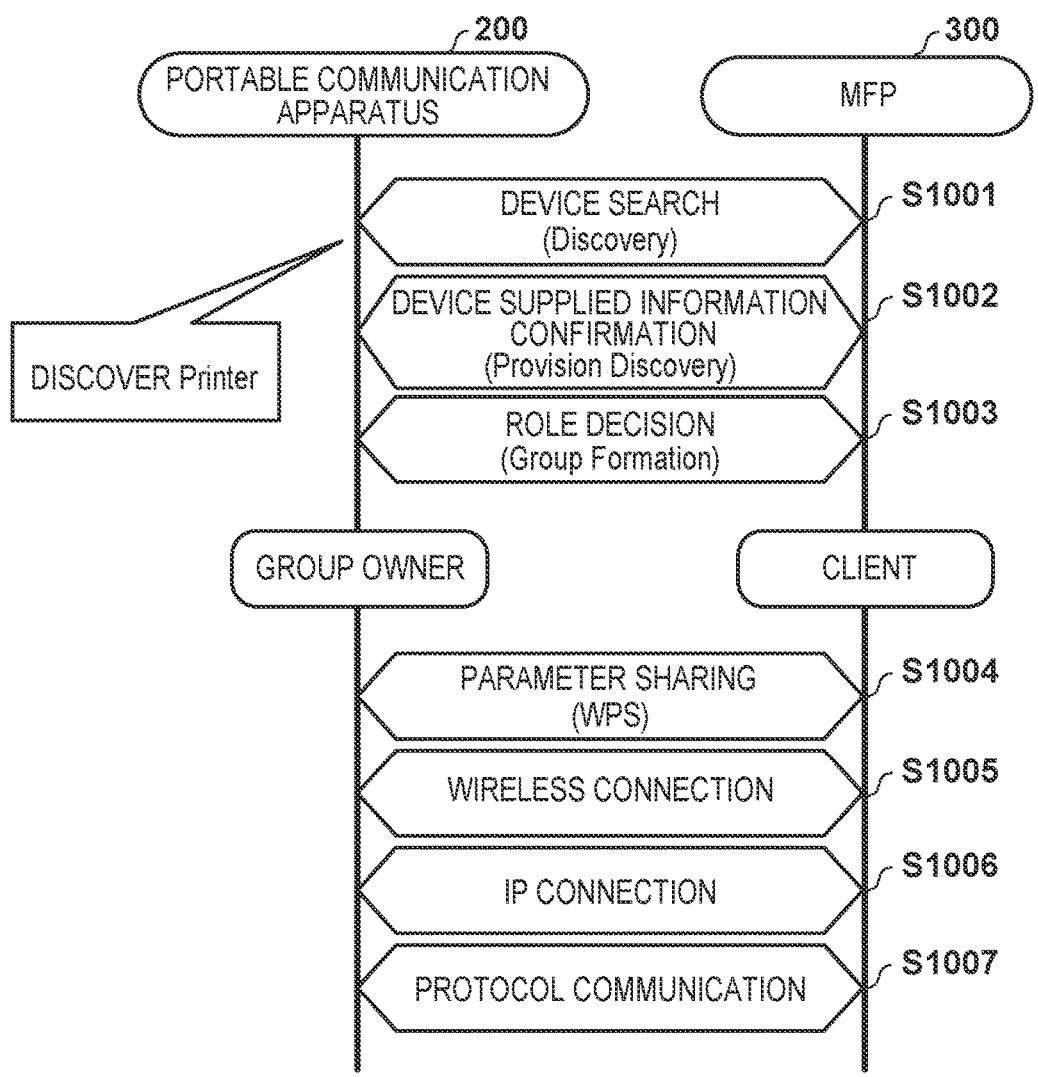
FIG. 10 illustrates a WFD mode wireless connection sequence (the MFP 300: a client).

FIG. 10 illustrates a WFD mode wireless connection sequence when the MFP 300 is the client. Because the processing of step S1001 through step S1003 is similar to the processing of step S901 through step S903 of FIG. 9, explanation thereof is omitted. However, in FIG. 10, in step S1003 the role of the MFP 300 is decided to be the client. In step S1004, the portable communication apparatus 200 and the MFP 300 exchange parameters for performing communication by Wi-Fi Direct (the parameter sharing phase). This processing is based on a WPS sequence. In the example of FIG. 10, the MFP 300 is the client, and the MFP 300 operates as an Enrollee of WPS. In step S1005, the portable communication apparatus 200 (the group owner) and the MFP 300 (the client) perform wireless connection processing (the wireless connection phase). In step S1006, the MFP 300 (the client) and the portable communication apparatus 200 (the group owner) perform IP connection processing (the IP connection phase). The MFP 300 that is the client operates as a DHCP client, and obtains an IP address from the portable communication apparatus 200 (the group owner). In step S1007, the portable communication apparatus 200 (the group owner) and the MFP 300 (the client) perform communication that uses a network protocol (service) (the protocol communication phase).

Next, with a configuration as explained above, where a device that can communicate by Wi-Fi Direct (hereinafter referred to as a Wi-Fi Direct device) is a client, explanation by the following embodiments is given for a method of improving usability after a connection with another Wi-Fi Direct device has been disconnected.

First Embodiment

A first embodiment is explained by a flow as follows. Specifically, firstly explanation is given regarding a state of the MFP 300 before a role decision for the group owner or the client in Wi-Fi Direct is performed. The state of the MFP 300 before a role decision is performed is a state after the power supply of the MFP 300 is activated, for example. Next, explanation is given regarding a state of the MFP 300 after a connection is accordance with the Wi-Fi Direct group owner role. The MFP 300, which has the group owner role, can continue to maintain a state as a base station even if a connection from another Wi-Fi Direct device is disconnected. Consequently, a problem such as usability decreasing in relation to detection or establishment of a new connection after the disconnection does not occur. Next, explanation is given regarding a state of the MFP 300 after a connection, in accordance with the Wi-Fi Direct client role. The MFP 300 which has the client role cannot be detected from another Wi-Fi Direct device under the specification. Next, explanation is given regarding a state of the MFP 300 after a disconnection, in accordance with the Wi-Fi Direct client role. The MFP 300 in this state is in an indefinite state under the specification, but because it is in a state that is close to the client role or is close to a suspended state without limit, it cannot be detected from another Wi-Fi Direct device. Finally, explanation is given of reactivation processing of the MFP 300 after a disconnection, in accordance with the Wi-Fi Direct client role. The MFP 300 stops the client role, and performs a reactivation so as to enter a state in which detection from another Wi-Fi Direct device and reconnection are possible.

<State of MFP 300 Before Role Decision in Wi-Fi Direct>

Figure 11:
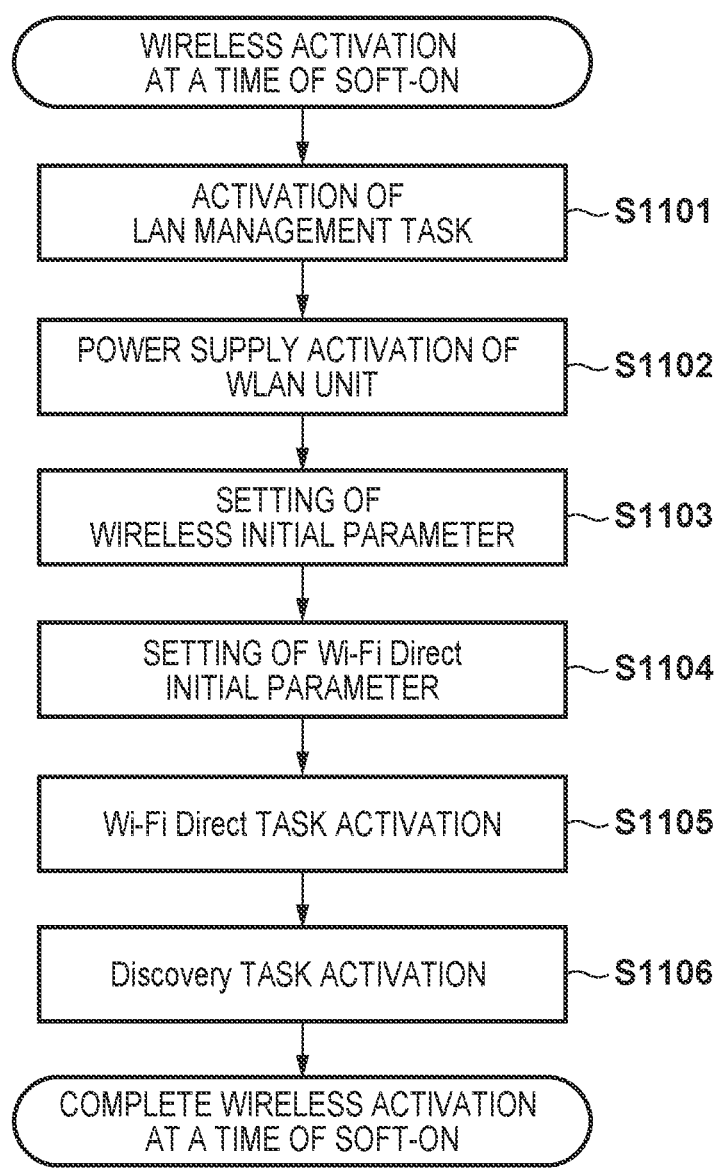

Explanation is given regarding operation of the MFP 300 before a decision is made for which role of client or group owner a Wi-Fi Direct device becomes. FIG. 11 illustrates a flow of processing, after the power supply of the MFP 300 is activated, until activation of the WFD mode completes (wireless activation processing at a time of soft-on).

Firstly, in step S1101, the CPU 602 of the MFP 300 activates a LAN management task for managing LAN control that includes a wireless LAN and Wi-Fi Direct. Under management by the embedded OS that is stored in the ROM 603, software control such as scheduling or task switching is performed, and the LAN management task is one task of these. In step S1102, the CPU 602 activates the power supply of the WLAN unit 616 in accordance with the LAN management task. In step S1103, the CPU 602 sets initial wireless parameters for the WLAN unit 616. In the initial wireless parameters a frequency band, a channel width or the like are specified.

In step S1104, the CPU 602 sets initial Wi-Fi Direct parameters. Initial Wi-Fi Direct parameters are the following, for example.

The Intent value used in the role deciding phase (Group Owner Negotiation) of step S1003 of FIG. 10

A channel number or an SSID (Service Set Identifier) used in activation of the group owner, if group owner is decided in the role deciding phase of step S1003 of FIG. 10

A device name or a WPS setting method (a PBC method, a PIN method, or the like) as parameters used in parameter sharing (WPS) of step S1204

In step S1105, the CPU 602 activates a Wi-Fi Direct task based on the LAN management task activated in step S1101. The CPU 602, based on the Wi-Fi Direct task, performs control in accordance with Wi-Fi Direct command transmission/reception or a received command. In step S1106, the CPU 602 activates a Discovery task based on the Wi-Fi Direct task activated in step S1105. The CPU 602, based on the Discovery task, executes a sequence so that Wi-Fi Direct devices perform a device search therebetween, in accordance with a Wi-Fi Direct specification. Wireless activation processing at a time of a soft-on completes when the Discovery task is activated.

FIG. 12 illustrates a flow of the Discovery task processing that is activated in step S1106. The CPU 602 of the MFP 300, based on the Discovery task, performs processing for the device search phase (Discovery) that is illustrated by step S901 of FIG. 9 and step S1001 of FIG. 10. The Discovery task processing includes two types of Discovery processing: processing for scanning an entire frequency band for wireless channels (step S1201), and device detection processing by a band (channel) subset (step S1202).

In the scanning processing of step S1201, the MFP 300 confirms whether a Wi-Fi Direct device is present in a periphery of the MFP 300. Specifically, by the control by the CPU 602, the WLAN unit 616 transmits a device search command (Probe Request) for all channels. Note that the processing of step S1201 corresponds to a Scan Phase under a Wi-Fi Direct specification.

In the device detection processing of step S1202, the MFP 300 performs a detection for a Wi-Fi Direct device that is in the periphery of the MFP 300. Specifically, under control by the CPU 602, the WLAN unit 616 alternatingly performs reception and transmission of a device search command (Probe Request) for only a determined subset of channels out of all of the channels. Note that a value of a determined subset of channels conforms to a Wi-Fi Direct specification, and explanation thereof is omitted.

In the Discovery task, loop processing for step S1201 through step S1203 is performed. In step S1203, a determination for a termination condition for leaving the loop is made. As a condition for ending the Discovery processing, there are the following conditions as examples.

By the Discovery processing of step S1201 or step S1202, a Wi-Fi Direct device in the periphery is detected, and the MFP 300 transitions to a subsequent device supplied information confirmation phase (step S902 of FIG. 9 or step S1002 of FIG. 10).

The WFD mode of the MFP 300 is disabled.

The MFP 300 is powered off.

A predetermined interval (for example 120 seconds) has elapsed.

If a termination condition is satisfied (Yes in step S1203), the Discovery task processing ends, and if no termination condition is satisfied (No in step S1203), the scanning processing (step S1201) and device detection processing (step S1202) are performed again.

Figure 13:
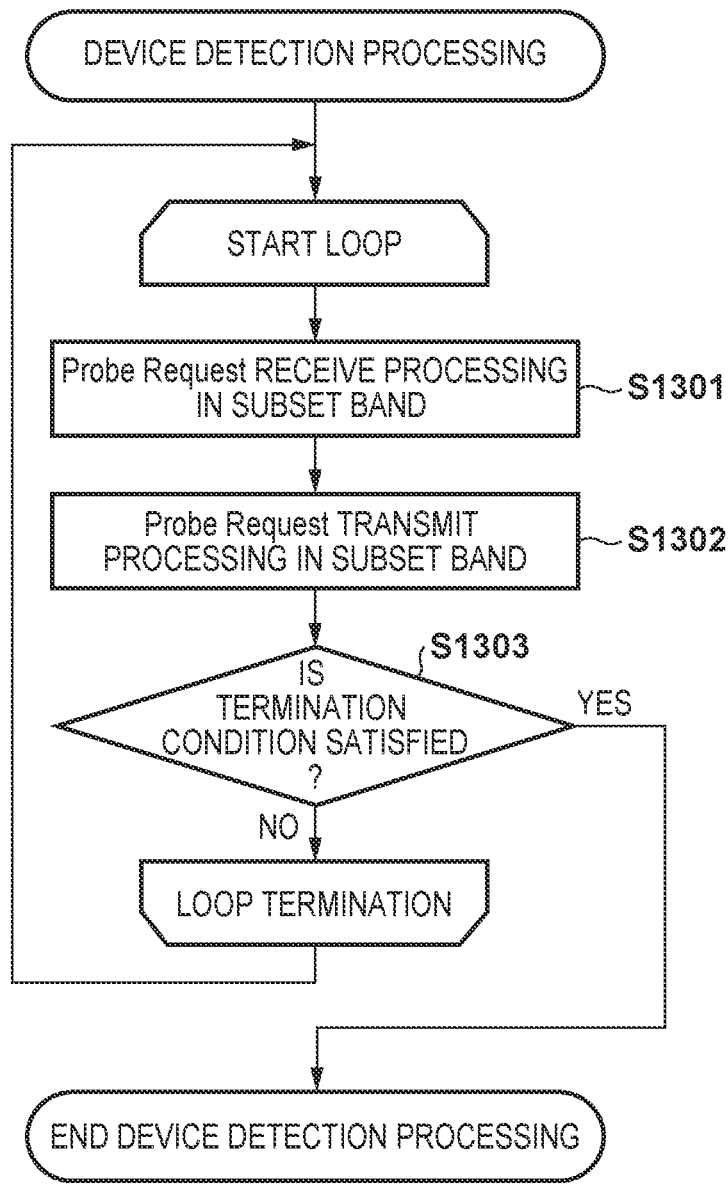
FIG. 13 illustrates a flow of device detection processing performed by a Discovery task.

FIG. 13 illustrates a flow of device detection processing performed in step S1202. Note that the loop processing of FIG. 13 corresponds to a Find Phase under a Wi-Fi Direct specification. In the device detection processing, the processing of step S1301 and the processing of step S1302 are alternatingly performed. In other words, Wi-Fi Direct devices, including the MFP 300, use a channel group in a subset to respectively transmit/receive Probe Requests therebetween. A Wi-Fi Direct device that has received a Probe Request can return a Probe Response as a response.

In step S1301, the MFP 300 waits a fixed interval for a Probe Request from a Wi-Fi Direct device in the periphery thereof. Upon receiving by any channel in the subset a Probe Request via the WLAN unit 616, the MFP 300 responds with a Probe Response in that channel. Note that a state of step S1301 corresponds to a Listen State under a Wi-Fi Direct specification. A Listen State Wi-Fi Direct device can respond to a Probe Request that includes a WFD attribute. Regarding a response sequence for a Probe Request that includes a WFD attribute, it is as illustrated by the Wi-Fi Direct device search sequence of FIG. 8.

In step S1302, the MFP 300, via the WLAN unit 616, transmits a Probe Request to each of all of the channel group in the subset for the Wi-Fi Direct device in the periphery. A state of step S1302 corresponds to a Search State under a Wi-Fi Direct specification.

As a result of the processing of step S1301 and step S1302, the MFP 300 determines one channel for which mutual communication with a specific Wi-Fi Direct device is possible, and successively transitions to the device supplied information confirmation phase and the role decision phase. The device supplied information confirmation phase is as indicated by step S902 of FIG. 9 and in step S1002 of FIG. 10. The role decision phase is as indicated by step S903 of FIG. 9 and in step S1003 of FIG. 10.

In the device detection processing illustrated by FIG. 13, loop processing of step S1301 through step S1303 is performed, and a termination condition for leaving the loop is determined in step S1303. As conditions for ending the device detection processing, there are the following conditions.

In the Probe Request transmission and reception processing of step S1302 or step S1301, a device in the periphery is detected, and a transition is made to a subsequent device supplied information confirmation phase.

The WFD mode of the MFP 300 is disabled.

The MFP 300 is powered off.

The processing of step S1301 and step S1302 is alternatingly repeated for a defined number of times.

A predetermined interval (for example 120 seconds) has elapsed.

If a termination condition is satisfied (Yes in step S1303) the processing returns to step S1203 of FIG. 12, and if no termination condition is satisfied (No in step S1303) transmission/reception of a Probe Request (step S1301 and step S1302) is performed.

<State of MFP 300 after Connection in Wi-Fi Direct Group Owner Role>

Explanation is given regarding a state of the MFP 300 for which a role is decided to be the group owner after the MFP 300 and the portable communication apparatus 200 have made a connection by Wi-Fi Direct. In other words, this is a state of the MFP 300 for which the group owner role has been decided as a result of the MFP 300 performing a role decision with the portable communication apparatus 200 in step S903 of FIG. 9.

The MFP 300 and the portable communication apparatus 200 establish a wireless connection via the parameter sharing phase (step S904) and the wireless connection phase (step S905). At this point, because the MFP 300 is operating as the group owner (in other words, a wireless base station), even if a disconnection occurs with respect to the portable communication apparatus 200 for some reason, its role as a base station continues thereafter. Consequently, the MFP 300 can detect that a connection with the portable communication apparatus 200 has been disconnected, but it has no disconnection state as a state of the base station itself. In other words, even if the connection between the MFP 300 and the portable communication apparatus 200 is disconnected, the MFP 300 continues to operate as the group owner, and it is possible for another new portable communication apparatus to make a device search and request a connection by Wi-Fi Direct with respect to the MFP 300.

<State of MFP 300 after Connection in Wi-Fi Direct Client Role>

Explanation is given regarding a state of the MFP 300 for which a role is decided to be a client after the MFP 300 and the portable communication apparatus 200 have made a connection by Wi-Fi Direct. In other words, this is a state of the MFP 300 for which the client role has been decided as a result of the MFP 300 performing a role decision with the portable communication apparatus 200 in step S1003 of FIG. 10.

The MFP 300 and the portable communication apparatus 200 establish a wireless connection via the parameter sharing phase (step S1004) and the wireless connection phase (step S1005). Next, the MFP 300 and the portable communication apparatus 200 establish a wireless connection (step S1005), make an IP connection (step S1006) and start protocol communication (step S1007).

In this point, in FIG. 12 the MFP 300 is in a state of having made a wireless connection as Discovery task processing, and this is a state for which the loop processing is broken out of. This is because the Discovery processing of step S1001 in FIG. 10 has ended. Consequently, the MFP 300 in this state will not be found when searched for from another Wi-Fi Direct device.

<State of MFP 300 after Disconnection in Wi-Fi Direct Client Role>

At this point, because the MFP 300 is operating as a client (wireless terminal/station), if a disconnection for a connection with the portable communication apparatus 200 occurs for any reason, it enters an indefinite state under the specification. In addition, for a Wi-Fi Direct connection, a usage pattern in which a temporary connection from a mobile terminal or the like as a group owner to a client device is made is often envisioned. Therefore, if the client device disconnects the connection, operation in which a reconnection is automatically performed as with a normal Wi-Fi connection cannot be mutually expected, and the connection is left as disconnected. As a result, with reference to FIG. 12, the MFP 300 enters a state in which the Discovery task processing stays in an end state, and the client role as in FIG. 10 is maintained unchanged. The MFP 300 in this state cannot be detected from the portable communication apparatus 200, and it is not possible to expect a wireless reconnection with the portable communication apparatus 200 to be made autonomously. Therefore, the MFP 300 in this state can be said to be close to a state in which it is stopped without limitation for Wi-Fi Direct.

<Reactivation of MFP 300 after Disconnection while in Wi-Fi Direct Client Role>

Figure 14:
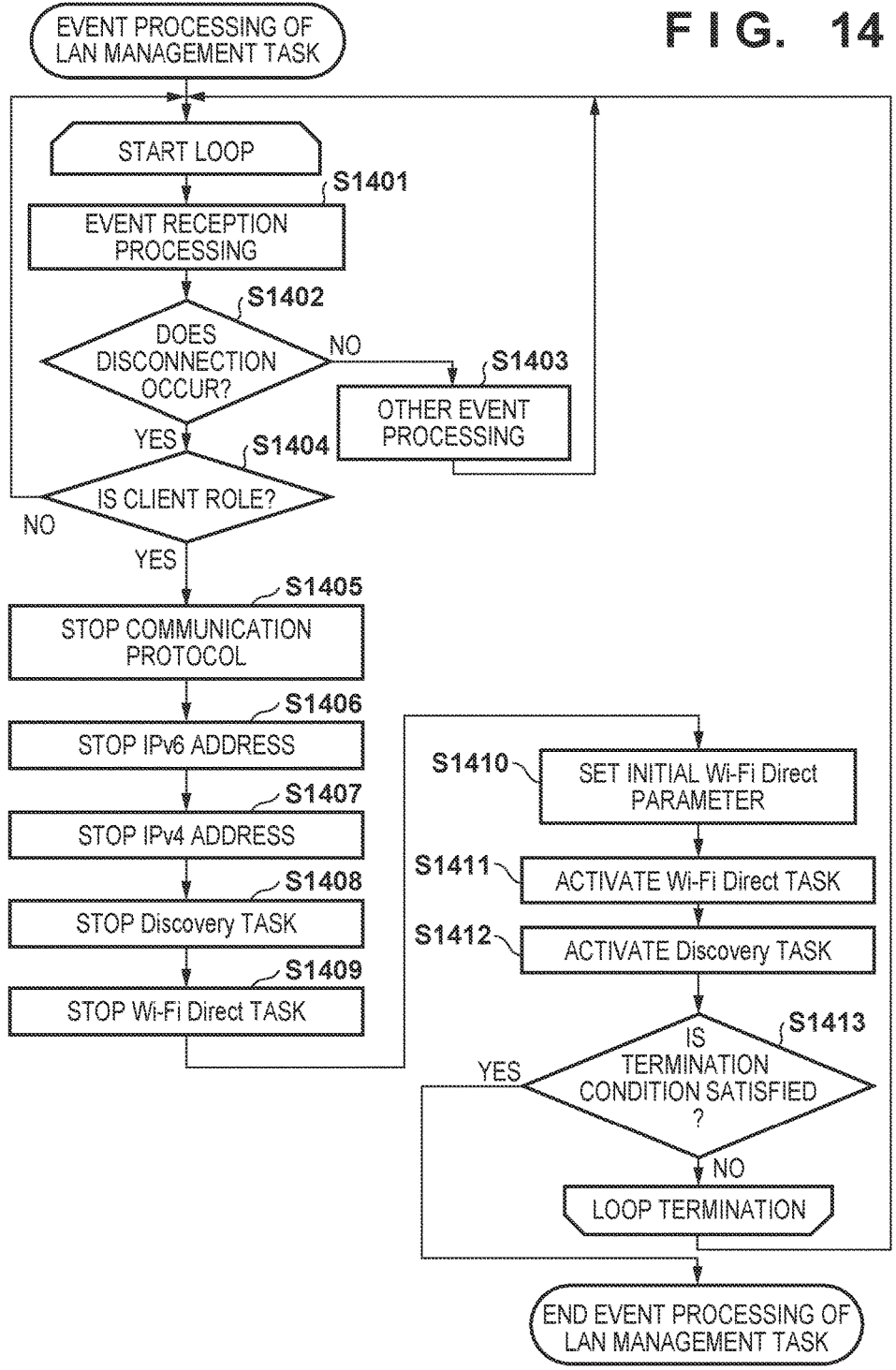
FIG. 14 illustrates a flow of reactivation processing in a first embodiment.

Explanation is given regarding processing for executing a reactivation as a Wi-Fi Direct device after a disconnection while in a Wi-Fi Direct client role. FIG. 14 is a view that illustrates a flow for processing in which a Wi-Fi Direct device that operates as a client executes a reactivation.

As illustrated by step S1101 of FIG. 11, the LAN management task of the MFP 300 is a task for performing sequence control relating to LAN control for performing power supply activation of the WLAN unit in step S1102 and activation of the Wi-Fi Direct task in step S1105. FIG. 14 illustrates event reception processing relating to the LAN control of the LAN management task in the present embodiment. As main events relating to the LAN control, there are events detected by the WLAN unit 616 of FIG. 6. As a detected event, specifically there is a connection event when an external wireless device has connected, and a disconnection event for when an external wireless device has disconnected.

In step S1401, when the WLAN unit 616 of the MFP 300 has received an event for a wireless connection with an external device, the CPU 602 determines a type of the received wireless connection event. In step S1402, if the received wireless connection event is not determined to be a disconnection event, in other words if a disconnection has not occurred (No in step S1402), the CPU 602 processes the event as another event (step S1403). Meanwhile, in step S1402, if the received wireless connection event is determined to be a disconnection event, in other words if a disconnection has occurred (Yes in step S1402), in step S1404 role determination processing is executed. As a result, if the current state of the MFP 300 is the group owner role (No in step S1404), the beginning of the loop processing is returned to, and the processing of step S1401 is executed. As a result of the role determination processing of step S1404, if the current state of the MFP 300 is the client role (Yes in step S1404), reactivation processing as a Wi-Fi Direct device of step S1405 through step S1412 is executed.

The reactivation processing of step S1405 through step S1412 is divided into stopping processing of step S1405 through step S1409 and activation processing of step S1410 through step S1412. Firstly, explanation is given regarding the stopping processing. In step S1405, the CPU 602 stops all communication protocols that have been activated by the WFD mode. In step S1406, the CPU 602 stops processing relating to an allocated IPv6 address. In step S1407, the CPU 602 stops processing relating to an allocated IPv4 address. In step S1408, the CPU 602 stops the Discovery task. Note that if this has been already been stopped, this process is skipped. In step S1409, the CPU 602 stops the Wi-Fi Direct task.

Next, explanation is given regarding the activation processing. In step S1410, the CPU 602 sets initial Wi-Fi Direct parameters. In step S1411, the CPU 602 activates the Wi-Fi Direct task. In step S1412, the CPU 602 activates the Discovery task. In step S1413, if a termination condition is satisfied, the loop processing of FIG. 14 ends. As a condition for ending, conditions such as a WFD mode of the MFP 300 being disabled, the MFP 300 being powered off, or the like may be given. Note that, as the reactivation processing, the reactivation processing of step S1405 through step S1412 illustrated in FIG. 14 is an example, and it is sufficient if processing required to have the MFP 300 enter a state in which communication by Wi-Fi Direct is possible is performed.

A state of the MFP 300 after the WFD mode is reactivated is the same state as that of the device search phase of step S1001 which is illustrated in FIG. 10. Consequently, after the Discovery task activation in step S1412, regarding the MFP 300 starting a wireless connection, an IP connection, and communication protocol activation, they have similar timings as those in step S1002 through step S1007 of FIG. 10. Note that processing of step S1410 through step S1412 is the same processing as that of step S1103 through step S1106 of FIG. 11.

Note that, in FIG. 14, configuration is such that the MFP 300 is minimally reactivated, and the reactivation is performed in as short an interval as possible. However, this does not limit the scope of the reactivation, and configuration may be taken so as reactivate in any state in step S1102 through step S1106 of FIG. 11. In such a case, configuration make be taken such that the CPU 602 stops the power supply of the WLAN unit 616 after performing the stopping processing of step S1405 through step S1409, and subsequently executes the activation processing of step S1102 through step S1103, and executes the activation processing of step S1410 through step S1412.

Irrespective of the extent of the stoppage/activation in the reactivation of the WFD mode, activation of the Discovery task of step S1412 is performed after the WFD mode is reactivated in FIG. 14. Consequently, in spite of the fact that a connection was disconnected while in the client state, the MFP 300 can autonomously perform a reactivation. Immediately after a reactivation, the MFP 300 can perform two types of Discovery processing: processing for scanning in accordance with an entire frequency band of wireless channels in step S1201 of FIG. 12, and device detection processing in a band subset in step S1202.

In this way, by virtue of the present embodiment, the MFP 300 that operates as a client can autonomously perform a reactivation after a connection with the portable communication apparatus 200 that operates as the group owner is disconnected. By this, the MFP 300 can be detected from another Wi-Fi Direct device. By this usability improves because the other Wi-Fi Direct device can continue to connect to and use the MFP 300.

Second Embodiment

In the first embodiment, a reactivation of the WFD mode is performed autonomously by the MFP 300 detecting a disconnection of a connection. In the second embodiment, reactivation processing of the WFD mode is performed only if a user makes an instruction for reuse of the WFD mode after a status that a connection has been disconnected is notified to a user by using the operation display unit 610. If a user has used the operation display unit 610 to make an instruction for stopping of the WFD mode, only stopping processing of the WFD mode is performed.

Figure 15:
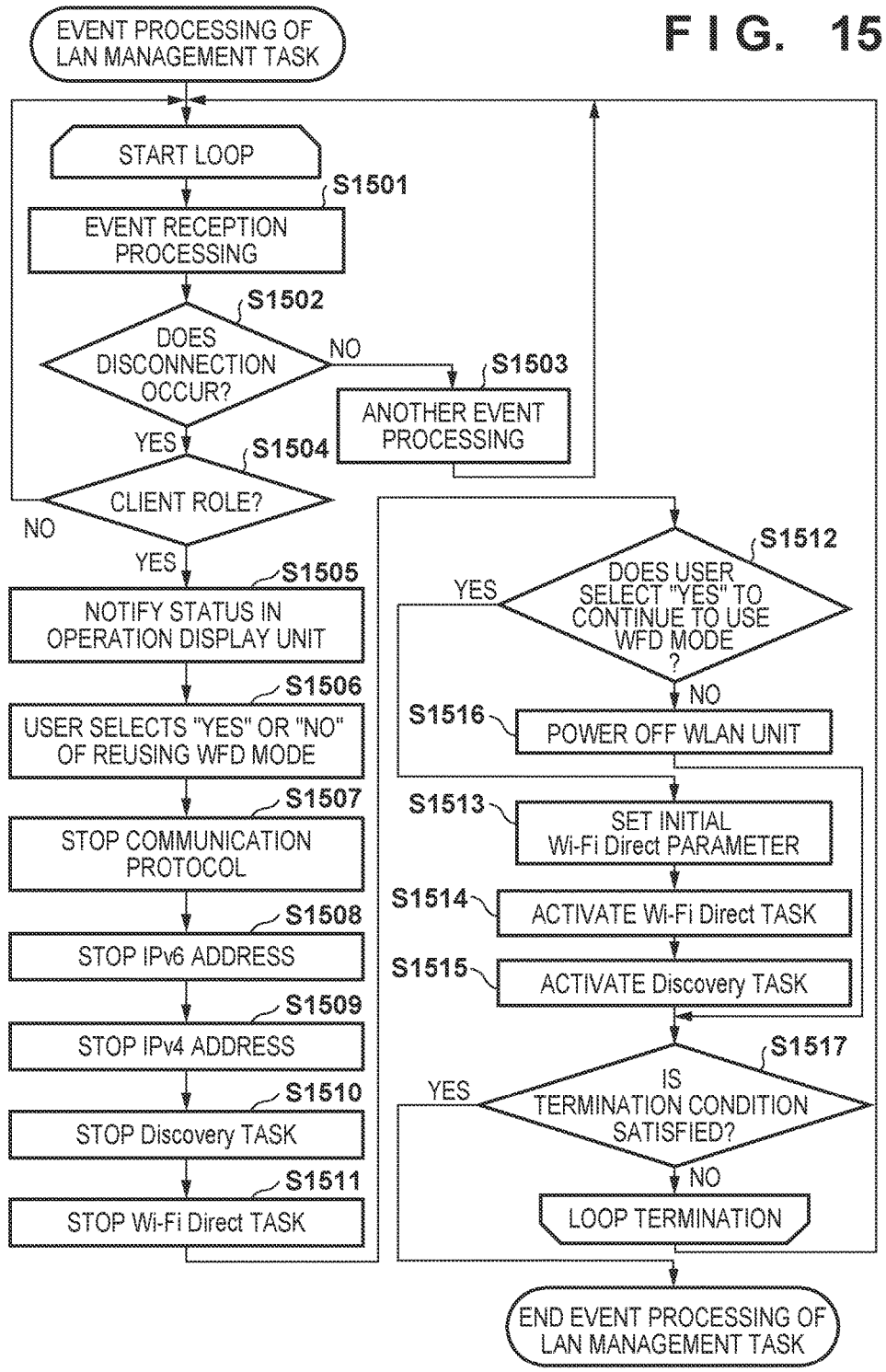
FIG. 15 illustrates a flow of reactivation processing in a second embodiment.

FIG. 15 illustrates event reception processing relating to the LAN control of the LAN management task in the present embodiment. Processing of step S1501 through step S1504 is the same as processing of step S1401 through step S1404 of FIG. 14. When the MFP 300 has the client role in the WFD mode, if the WLAN unit 616 detects a disconnection of a connection, in step S1505 the CPU 602 uses the operation display unit 610 to notify a user that the connection has been disconnected.

Figure 16:
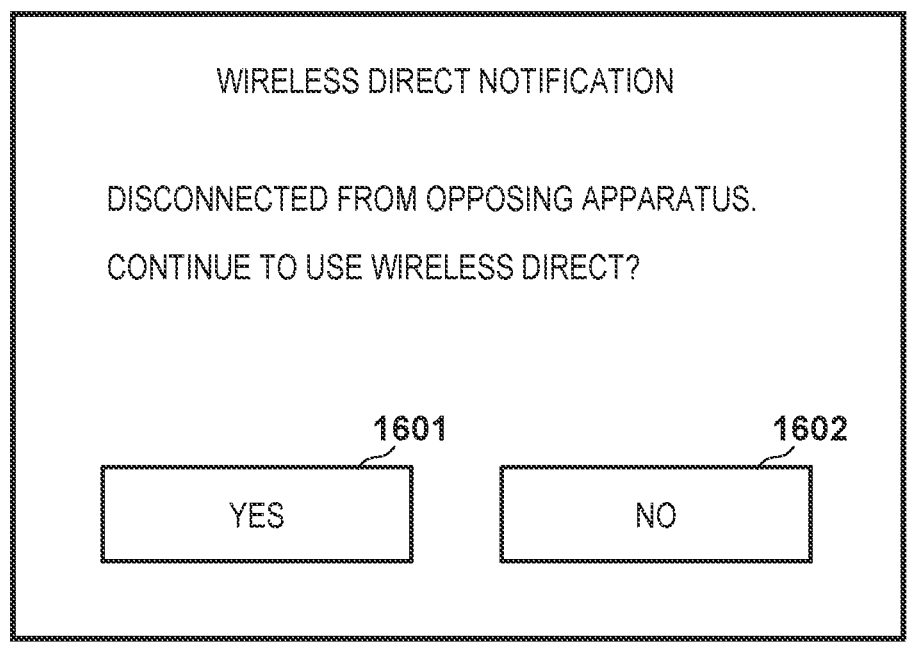
FIG. 16 illustrates an example of a notification screen of the MFP 300.

FIG. 16 illustrates an example of a notification screen that is displayed on the operation display unit 610 of the MFP 300. After the disconnection of the connection, the CPU 602 displays a status that the connection has been disconnected, as in FIG. 16, on the operation display unit 610 (step S1505). In step S1506, a user selects a "YES" button 1601 if they wish to continue to use the WFD mode. A user selects the "NO" button 1602 if they do not wish to continue to use the WFD mode. The stopping processing of step S1507 through step S1511 is performed as common processing, irrespective of a result of a selection of the "YES" button 1601 or the "NO" button 1602. Note that WFD mode stopping processing of step S1507 through step S1511 is the same as the processing of step S1405 through step S1409 of FIG. 14.

When the stopping processing of the WFD mode ends, in accordance with a result of selecting a button (the "YES" button 1601 or the "NO" button 1602) by a user, the CPU 602 determines whether to stop or reactivate the WFD mode (step S1512). If the "YES" button 1601 is selected by a user, the CPU 602 performs reactivation processing for the WFD mode. The reactivation processing of the WFD mode is the processing of step S1513 through step S1515, and this is the same as the processing of step S1410 through step S1412 of FIG. 14. If the "NO" button 1602 is selected by a user, the processing advances to step S1516, and only WFD mode stopping processing is performed. In step S1516, the CPU 602 causes the MFP 300 to enter a state in which the WFD mode is completely stopped by stopping the power supply of the WLAN unit 616. Termination conditions for leaving the loop processing in step S1517 are the same conditions as those in step S1413 of FIG. 14. Note that the screen of FIG. 16 is not limited to being displayed after a disconnection of the connection, and configuration may be taken so as to cause a user to select in advance by displaying it before a WFD connection is performed or after a connection is made but before there is a disconnection.

In this way, if a user selects to continue usage of the WFD mode in step S1506, activation of the Discovery task of step S1515 is performed after reactivation of the WFD mode. Consequently, in spite of the fact that a connection was disconnected while in the client state, the MFP 300 can autonomously perform a reactivation. Immediately after a reactivation, it is possible to perform two types of Discovery processing: processing for scanning in accordance with an entire frequency band of wireless channels in step S1201 of FIG. 12, and device detection processing in a band subset in step S1202. Consequently, a state is entered in which it is possible to continue to use the WFD mode from a periphery, in accordance with a user's intention.

Conversely, if a user selects to not continue to use the WFD mode in step S1506, the MFP 300 stops the WFD mode. Consequently, a state is entered in which it is not possible to use the WFD mode from a periphery, following a user's intention.

In this way, by virtue of the present embodiment, the MFP 300 that operates as a client can decide whether to perform a reactivation based on a user's determination, after a connection with the portable communication apparatus 200 that operates as the group owner is disconnected. By this, the MFP 300 can be detected from another Wi-Fi Direct device if a user desires a reconnection. By this, usability improves because the other Wi-Fi Direct device can continue to connect to and use the MFP 300.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-102763, filed May 23, 2016 which is hereby incorporated by reference herein in its entirety.

What is claimed is:

1. A communication apparatus capable of communication by a predetermined wireless connection method, the apparatus comprising:
   a decision unit configured to decide which of the communication apparatus and a communication partner apparatus operates as an access point and which operates as a client;
   a connection unit configured to connect to the communication partner apparatus by the predetermined wireless connection method, based on a decision by the decision unit;
   a determination unit configure to determine whether a connection by the connection unit is disconnected; and
   a reactivation unit configured to perform reactivation processing for causing the communication apparatus to stop using an IP address used in communication with the communication partner apparatus that is connected to by the connection unit, and enter a state in which communication by the predetermined wireless connection method is possible,
   wherein, if it is decided by the decision unit that the communication apparatus operates as the client and it is determined by the determination unit that the connection is disconnected, the reactivation unit performs the reactivation processing.

2. The communication apparatus according to claim 1, further comprising a selection unit configured to select whether to permit communication by the predetermined wireless connection method for the communication apparatus, based on a user operation,
   wherein, if it is decided by the decision unit that the communication apparatus operates as the client and it is determined by the determination unit that the connection with the communication partner apparatus is disconnected, and furthermore, if it is selected by the selection unit to permit communication by the predetermined wireless connection method, the reactivation unit performs the reactivation processing.

3. The communication apparatus according to claim 2, further comprising a stopping unit configured to stop communication by the predetermined wireless connection method,
   wherein, if it is decided by the decision unit that the communication apparatus operates as the client and it is determined by the determination unit that the connection with the communication partner apparatus is disconnected, and furthermore, if it is selected by the selection unit to not permit communication by the predetermined wireless connection method, the stopping unit stops communication by the predetermined wireless connection method.

4. The communication apparatus according to claim 1, further comprising a detection unit configured to detect a connection event by the predetermined wireless connection method, wherein
   the determination unit, if the connection event detected by the detection unit is a disconnection event, determines that a connection with the communication partner apparatus has been disconnected.

5. The communication apparatus according to claim 1, wherein the reactivation processing includes processing for stopping processing for operating as the client.

6. The communication apparatus according to claim 1, wherein the reactivation processing includes processing for detecting another communication apparatus that is capable of communication by the predetermined wireless connection method.

7. The communication apparatus according to claim 1, wherein the predetermined wireless connection method is a wireless connection method that conforms to Wi-Fi Direct.

8. A communication method by a predetermined wireless connection method, the method comprising:
   deciding which of a communication apparatus and a communication partner apparatus operates as an access point and which operates as a client;
   connecting the communication apparatus and the communication partner apparatus by the predetermined wireless connection method, based on the decision;
   determining whether the connection is disconnected; and
   if it the decision is that the communication apparatus operates as the client and the determination is that the connection is disconnected, performing reactivation processing for causing the communication apparatus to stop using an IP address used in communication with the communication partner apparatus, and enter a state in which communication by the predetermined wireless connection method is possible.

9. A non-transitory computer-readable storage medium storing a computer program for causing a computer to execute a communication method by a predetermined wireless connection method, the method comprising:
   deciding which of a communication apparatus and a communication partner apparatus operates as an access point and which operates as a client;
   connecting the communication apparatus and the communication partner apparatus by the predetermined wireless connection method, based on the decision;
   determining whether the connection is disconnected; and
   if it the decision is that the communication apparatus operates as the client and the determination is that the connection is disconnected, performing reactivation processing for causing the communication apparatus to stop using an IP address used in communication with the communication partner apparatus, and enter a state in which communication by the predetermined wireless connection method is possible.

* * * * *